(12) United States Patent  (10) Patent No.: US 6,695,378 B2
Hanagan  (45) Date of Patent: Feb. 24, 2004

(54) VEHICLE SEAT WITH MOVABLE BACKREST

(75) Inventor: Michael W. Hanagan, Hollister, CA (US)

(73) Assignee: Corbin Pacific, Inc., Hollister, CA (US)

( * ) Notice: Subject to any disclaimer, the term of this patent is extended or adjusted under 35 U.S.C. 154(b) by 0 days.

(21) Appl. No.: 10/131,451

(22) Filed: Apr. 22, 2002

(65) Prior Publication Data

US 2003/0197393 A1 Oct. 23, 2003

(51) Int. Cl.[7] .................................................. B60N 2/02
(52) U.S. Cl. ..................... 296/65.01; 297/383; 297/353
(58) Field of Search ........................ 296/65.01, 65.02, 296/65.16; 297/383, 353, 188.1

(56) References Cited

U.S. PATENT DOCUMENTS

| 1,332,957 | A | * | 3/1920 | Schramm |  |
|---|---|---|---|---|---|
| 1,467,645 | A |  | 9/1923 | McPherson |  |
| 1,767,925 | A | * | 6/1930 | Hargreaves |  |
| 1,968,232 | A |  | 7/1934 | Thomas |  |
| 2,075,821 | A | * | 4/1937 | Meyers |  |
| 2,357,825 | A |  | 9/1944 | Hickman et al. |  |
| 2,859,797 | A |  | 11/1958 | Mitchelson |  |
| 4,368,916 | A |  | 1/1983 | Blasin |  |
| 4,771,507 | A |  | 9/1988 | Draplin et al. |  |
| 4,971,380 | A |  | 11/1990 | Cote et al. |  |
| 5,364,151 | A |  | 11/1994 | Yurasits |  |
| 5,498,052 | A |  | 3/1996 | Severini et al. |  |
| 5,812,399 | A | * | 9/1998 | Judic et al. | 296/65.1 |
| 6,073,986 | A |  | 6/2000 | Neale et al. |  |
| 6,474,728 | B1 | * | 11/2002 | Mendis et al. | 296/65.01 |
| 6,488,327 | B1 | * | 12/2002 | Pearse et al. | 297/188.1 |
| 2002/0005649 | A1 | * | 1/2002 | Hofmann et al. | 297/188.1 |

* cited by examiner

Primary Examiner—Stephen T. Gordon
Assistant Examiner—H. Gutman

(57) ABSTRACT

A vehicle seat includes a seat portion and an adjustable backrest portion which is movable between a forward operating position and a rearward operating position relative to the seat portion. Both the upper and lower sections of the backrest portion move upwardly relative to the seating portion when the backrest portion moves from the forward operating position to the rearward operating position. A lockable adjustment mechanism is included to enable a user to lock the backrest in a suitable position from the forward to the rearward operating positions.

18 Claims, 6 Drawing Sheets

VEHICLE SEAT WITH MOVABLE BACKREST

BACKGROUND OF THE INVENTION

The present invention relates to vehicle seats, and, more particularly, to adjustable vehicle seats for use in compact vehicles.

There is a demand for low and zero emissions commuter vehicles in areas with significant air pollution, such as large cities in California. In order to maximize efficiency, low and zero emissions vehicles frequently are designed with a streamlined contour. As a result, the cabin space is often quite limited. It would be useful to provide for such vehicles a vehicle seat which can be adjusted for users of various heights, and which takes up minimal space in the vehicle cabin.

It is an object of the present invention to provide a novel seat for use in compact commuter vehicles.

It is also an object to provide such a vehicle seat which can be adjusted for the comfort of drivers and/or passengers of various heights.

Another object is to provide such a vehicle seat which fits in a small cabin area and has a low center of gravity.

A further object is to provide such an adjustable vehicle seat which is sturdy and strong.

Yet another object is to provide a vehicle seat which can be quickly and conveniently adjusted by the user.

SUMMARY OF THE INVENTION

It has now been found that the foregoing and related objects may be readily attained in a vehicle seat comprising a seat portion having a forward end and a rearward end, support means for supporting the seating portion on a base wall of the vehicle, a backrest portion having an upper section and a lower section. The lower section is disposed adjacent the rearward end of the seating portion, and mounting means is provided for adjustably mounting the backrest portion on a generally vertical wall of the vehicle. The mounting means permits movement of the backrest portion between a forward operating position and a rearward operating position relative to the seat portion. Both the upper and lower sections of the backrest portion move upwardly relative to the seat portion when the seat moves from the forward operating position to the rearward operating position. The vehicle seat also includes adjustment means for adjusting the backrest portion into a desired position from the forward to the rearward operating position.

Desirably, the mounting means comprises first pivot means for pivotably connecting the lower section of the backrest portion to the generally vertical inner wall, and second pivot means for pivotably connecting the upper section of the backrest portion to the vertical inner wall.

Preferably, the adjustment means comprises spring means which may be a gas spring and, which most preferably is lockable in a multiplicity of adjusted positions.

Desirably, the adjustment means also includes lever means for adjusting the spring means.

Usually, the support means includes third pivot means for pivoting the seating portion between a seating position and a storage access position.

In one preferred form of the invention, the vehicle seat further comprises a headrest portion formed as a part of the backrest portion. The lower section of the backrest portion preferably includes a lumbar support portion.

In installing and using the seat of the present invention, there is provided an adjustable vehicle seat having a seat portion, and a backrest portion with upper and lower sections. The seat portion is supported in an operating position on a base wall in the vehicle, and the backrest portion is adjustably mounted on a vertical inner wall of the vehicle by providing a first pivot means connecting the upper section of the backrest portion to the vertical inner wall and a second pivot means connecting the lower section of the backrest portion to the vertical inner wall. The first and second pivot means permit movement of the backrest portion between a forward operating position and a rearward operating position relative to the seat portion. The method also includes mounting lockable spring means between the backrest portion and the vertical inner wall of the vehicle for locking the backrest portion in a selected position relative to the seat portion.

Desirably, the lockable spring means comprises a gas spring, and there is installed lever means for actuating the spring means.

Preferably, the seat portion is pivotally mounted, and this enables the seating portion to pivot between a seating position and a storage access position.

Desirably, the method also includes providing a headrest portion on the backrest portion.

DETAILED DESCRIPTION OF THE PREFERRED EMBODIMENT

Figure 1:
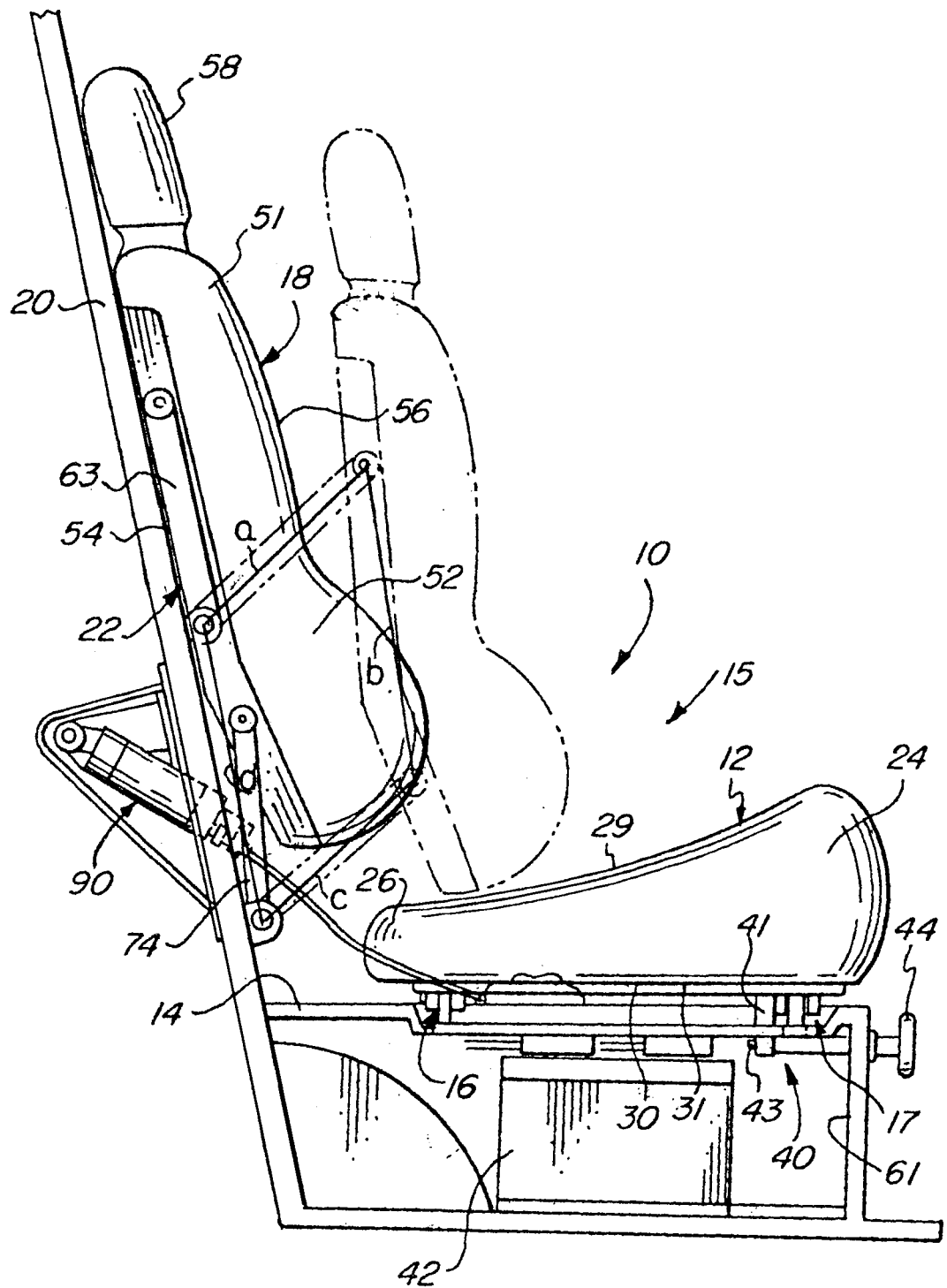
FIG. 1 is a side elevational view of a vehicle seat embodying the present invention, the backrest being shown in full line in the rearward position and in phantom line in the forward position.
Figure 2:
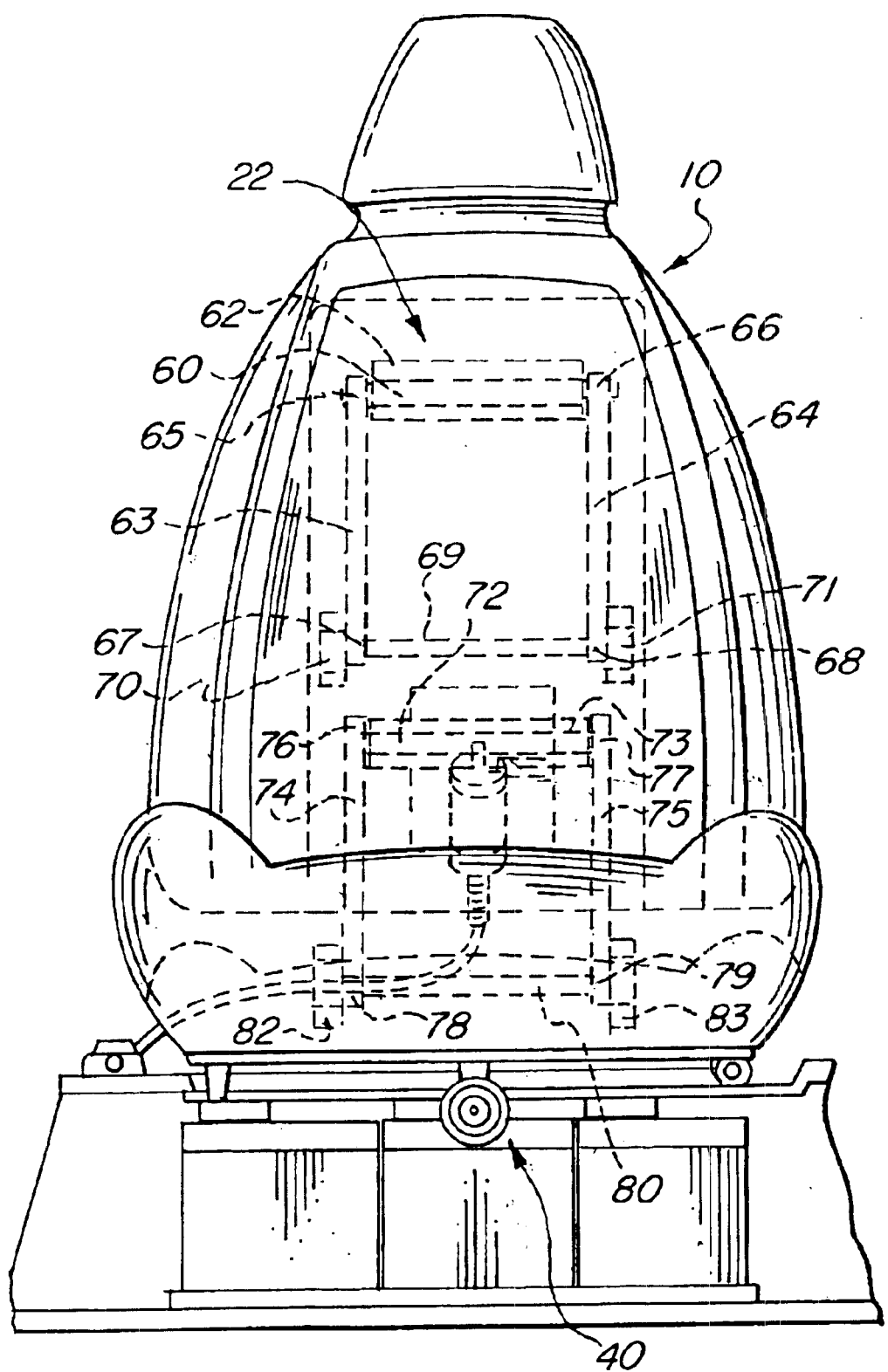
FIG. 2 is a front elevational view of the vehicle seat with the bracket system for adjusting the backrest being shown in broken lines.

Turning first to FIGS. 1–4 of the attached drawings, therein illustrated is a vehicle seat with an adjustable backrest and generally designated by the numeral 10. The vehicle seat 10 is comprised of a seat cushion 12 which is pivotably connected to a base wall 14 in the vehicle cabin 15 by first and second hinge assemblies 16 and 17. The vehicle seat 10 also includes a backrest 18 which is connected to the rear wall 20 of the vehicle cabin 15 by a bracket system generally designated by the numeral 22.

Turning now in detail to the seat cushion 12, it has a forward end 24, a rearward end 26, a left side 27, a right side 28, a top 29, and a bottom 30. The bottom 30 of the seating cushion 12 has a vapor seal 31 affixed thereto to prevent battery vapors from entering the vehicle cabin 15. The first and second hinge assemblies 16 and 17 pivotably connect the left side 27 of the seat cushion 12 along the bottom 30 to the base wall 14.

Figure 4:
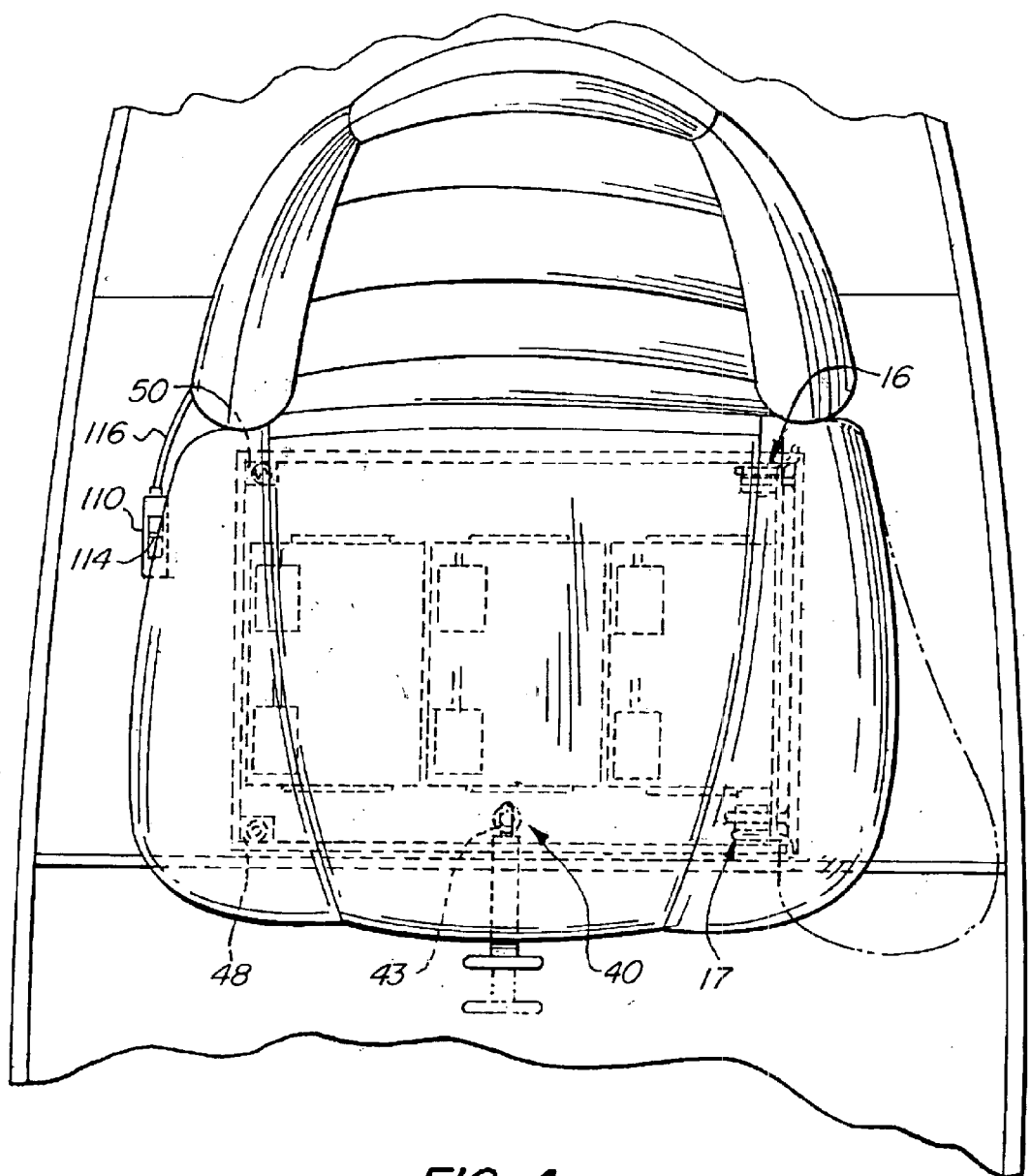
FIG. 4 is a top plan view of the vehicle seat with the seat cushion in the operating position.
Figure 5:
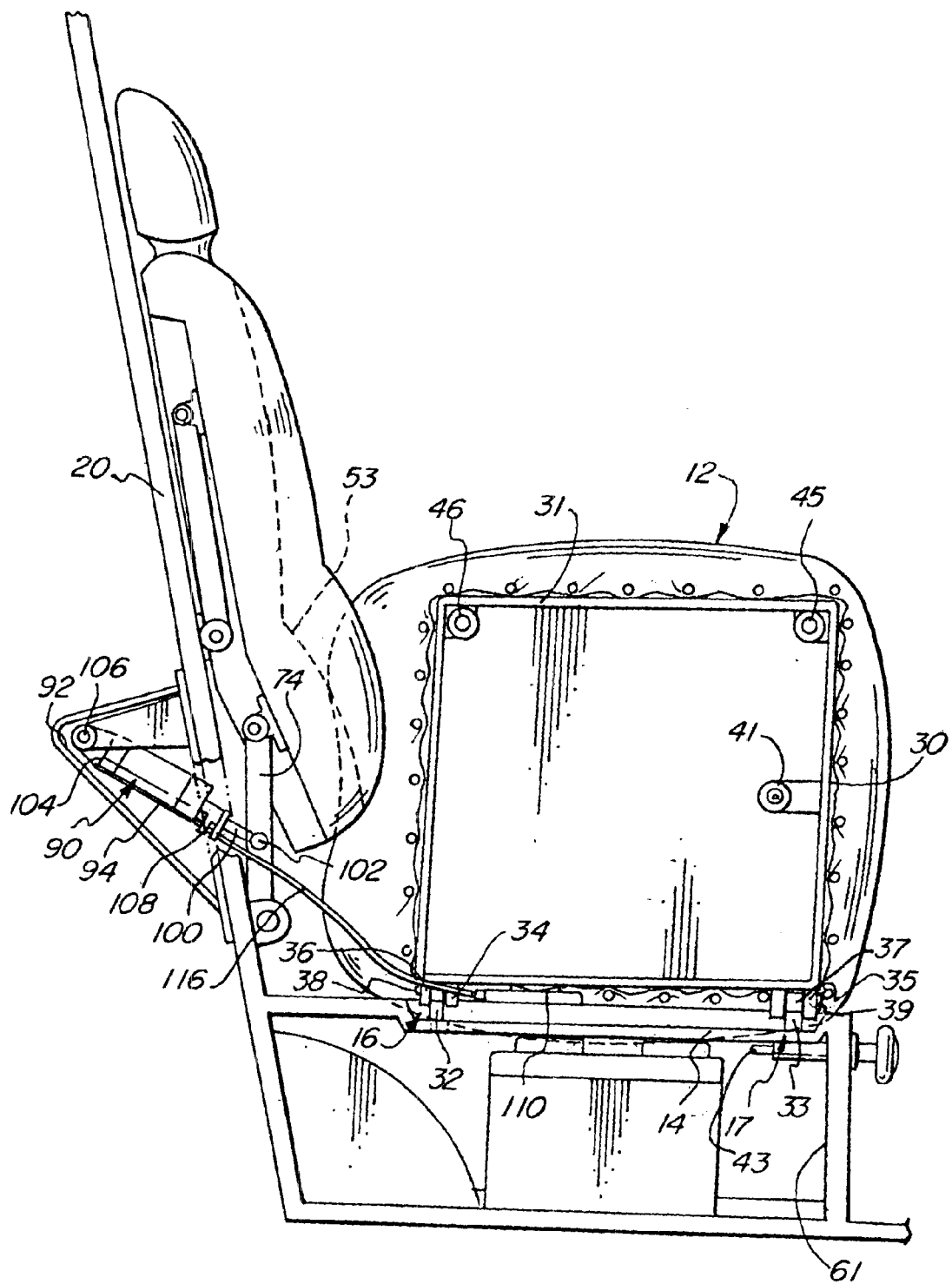
FIG. 5 is a side elevational view of the vehicle seat with the seat cushion pivoted upwardly.
Figure 6:
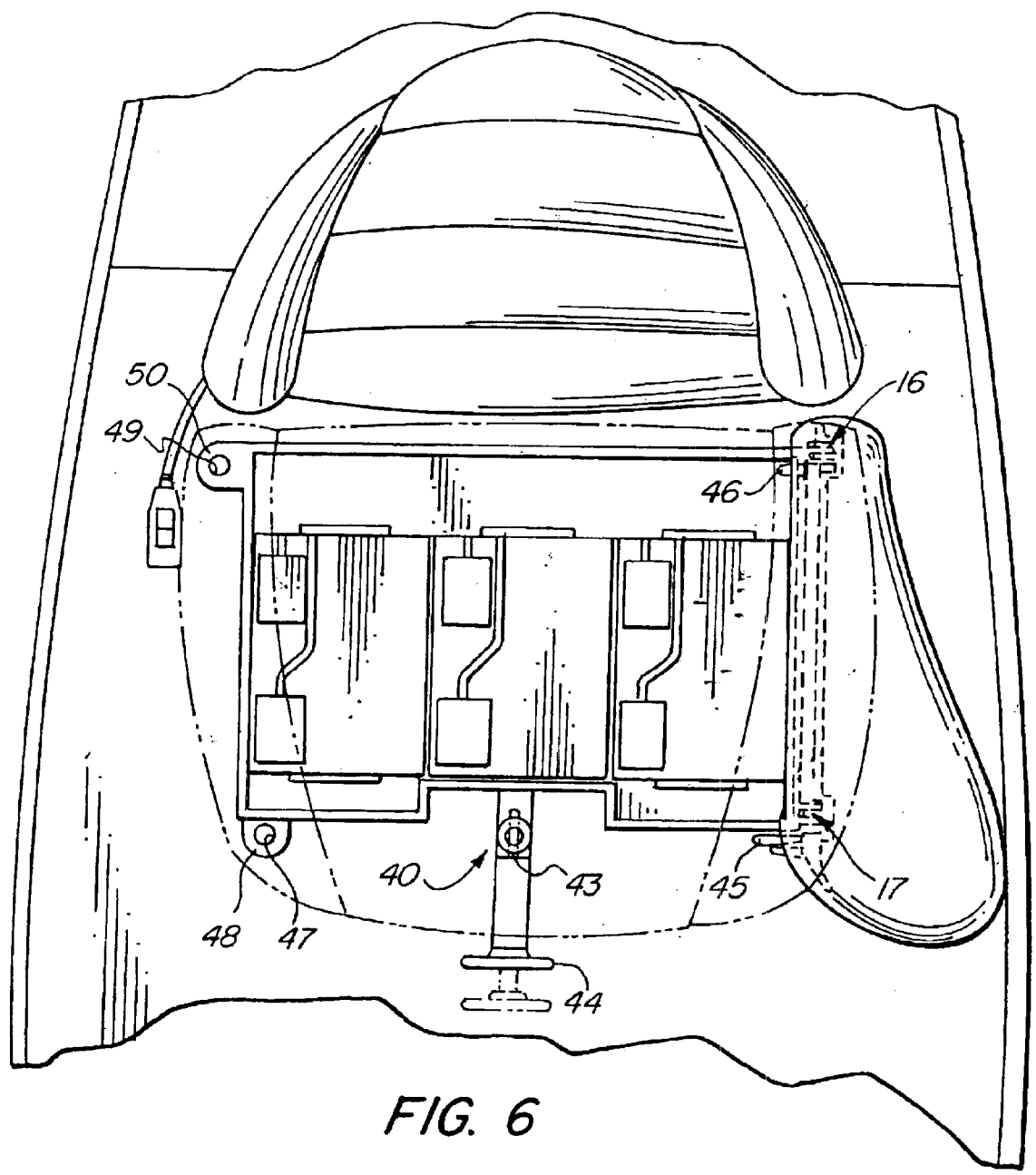
FIG. 6 is a top plan view of the vehicle seat with the seat cushion in the storage access position.

As shown in FIGS. 4–6, the first and second hinge assemblies 16, 17 include first and second bosses 32, 33 on the base wall 14 of the cabin 15, and corresponding first and second brackets 34, 35 mounted on the bottom 30 of the seating cushion 12. A first tubular member 36 is provided in a passageway through the first boss 32 and a first pivot pin 38 extends through the ears on the first bracket 34 and first tubular member 36 to provide a pivotal connection. Similarly, a second tubular member 37 is provided in a passageway through the second boss 33 and a second pivot pin 39 extends through the ears on the second bracket 35 and second tubular member 37 to provide a pivotal connection.

Figure 3:
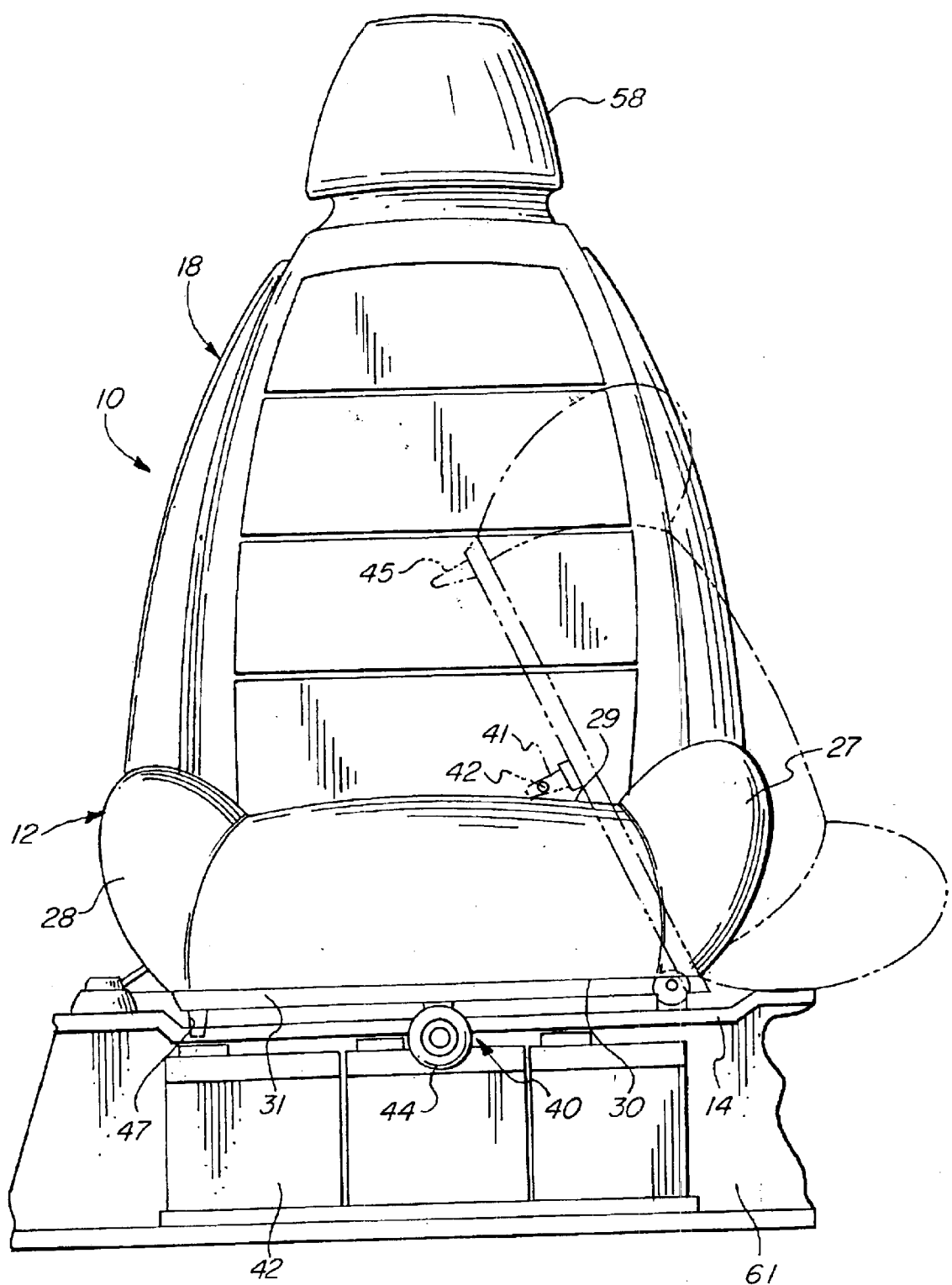
FIG. 3 is a front elevational view of the vehicle seat showing the upward pivoting of the seat cushion.

The seat cushion 12 can be pivoted upwardly, as is shown in FIG. 3, by releasing a latch 40, part of which is disposed on the bottom 30 of the seat cushion 12 at the forward end 24. A storage compartment 61 is positioned under the base wall 14 for storage of batteries 42 or other equipment. The storage compartment 61 is accessed by pivoting the seat cushion 12 upwardly.

The latch 40, shown in detail in FIGS. 1, 3 and 6, includes a first locking pin 41 depending from the bottom 30 of the seat cushion 12. The first locking pin 41 has an aperture 42 which receives the end of a horizontal, spring loaded second locking pin 43 which has a pull knob 44 at the front of the seat 10. The second locking pin 43 extends horizontally through a vertical portion of the base wall 14 and into the storage compartment 61 where it engages the aperture 42 in the first locking pin 41 in order to hold the seating cushion 12 in an operating position.

The seat cushion 12 is aligned in a seating or operating position by a front alignment pin 45 and a rear alignment pin 46, which are formed on the right side 28 along the bottom 30. The front alignment pin 45 is received in a bore 47 formed in a front pin alignment pad 48 in the base wall 14. The rear alignment pin 46 is received in a bore 49 formed in a rear pin alignment pad 50 in the base wall 14.

Turning now to the backrest 18, it has an upper section generally designated by the numeral 51, a lower section generally designated by the numeral 52, a rear side 54 and a front side 56. The lower section 52 includes a rounded projection 53 configured to support the lumbar region of the driver's back. In the illustrated embodiment, the backrest 18 also includes an integral headrest 58 at the top of the upper section 51.

The bracket system 22 which mounts the backrest 18 on the rear wall 20 of the vehicle cabin 15 includes a first upper pivot rod 60 pivotably mounted on the rear side 54 of the upper section 51 by a first upper mounting plate 62. First and second connecting arms 63, 64 are pivotably connected to opposite ends of the first upper pivot rod 60 at their upper ends 65, 66 respectively. The lower ends 67, 68 of the first and second upper connecting arms 63, 64 are pivotably mounted to the rear wall 20 by a second upper pivot rod 69 which is mounted on rear wall 20 by a pair of second upper mounting plates 70, 71.

The bracket system 22 also includes a first lower pivot rod 72 which extends horizontally across the rear side 54 of the backrest 18 at the lower section 52. The pivot rod 72 is pivotably mounted on the backrest 18 by a first lower mounting plate 73. First and second lower connecting arms 74, 75 are pivotably connected to opposite ends of the first lower pivot rod 72 at their upper ends 76, 77. The lower ends 78, 79 of the first and second lower connecting arms 74, 75 are connected to opposite ends of a second lower pivot rod 80 which is mounted on the rear wall 20 of vehicle cabin 15 by a pair of second lower mounting plates 82, 83.

In a preferred form of the invention, the upper and lower connecting arms 63, 64, 74 and 75 are attached to a roll bar portion of the vehicle, resulting in a strong and lightweight structure. When viewed from the side, the upper and lower connecting arms, 63, 64, 74 and 75, in conjunction with portions of the rear wall 20 and the rear side 54 of backrest 18, form a quadrangle that generally resembles a parallelogram when the backrest 18 is in the forward position. This quadrangle is shown in FIG. 1 by segments a, b, c, and d. It is noted, however, that each segment of the quadrangle has a different length in the preferred embodiment of the invention, thereby resulting in a slightly non-parallel arrangement.

The backrest 18 can be pivotably adjusted from a forward and low position, shown in broken lines in FIG. 1, to a rearward and elevated position, shown in solid lines in FIG. 1. Elevation of the backrest 18 as it is moved rearwardly elevates the headrest to a accommodate a taller operator. In accordance with the preferred embodiment of the invention, the backrest 18 also can be releasably fixed at any desired pivoted position between the forward and rearward positions. This important feature of the invention enables the seat 10 to be adjusted for the comfort of a particular user.

More specifically, the desired position of the backrest 18 relative to the rear wall 20 is fixed by a gas spring 90 which is housed in a spring support compartment 92 which extends rearwardly through the rear wall 20 of the vehicle cabin 15. The gas spring 90 has a cylinder 94 which houses a piston (not shown) connected to a rod 100 that extends outwardly from the cylinder 94. As is shown in FIG. 5, the outer end of the rod 100 is pivotably connected to the first and second lower connecting arms 74, 75 by a horizontally extending gas spring support rod 102. Rod 100 moves rearwardly into the cylinder 94 when the backrest 18 is pivoted to a rearward and elevated position, as is shown in solid line in FIG. 1. The rod 100 extends outwardly from the tube or cylinder 94 when the backrest 18 is pivoted to a forward and lower position, as is shown in broken lines in FIG. 1. The rearward end 104 of gas spring 90 is mounted in the spring support compartment 92 on a support rod 106, the end of which is shown in FIG. 5.

A release valve 108 is positioned toward the lower end of the cylinder 94 for adjusting the gas spring, thereby causing pivotal movement of the backrest 18. When release valve 108 is opened, the piston is movable within cylinder 94 in either direction. When the release valve 108 is closed, the piston rod 100 is fixed in whatever position it assumed at the time of valve closure. In this manner, a user can open the release valve 108 in order to adjust the backrest 18 to a comfortable position, and subsequently close release valve 108 to maintain the backrest 18 in that desired position.

In a particularly preferred embodiment of the invention, control of gas spring 90 by a user is facilitated by a valve adjustment lever 110 which is conveniently positioned beside the seat cushion 12. The valve adjustment lever 110 includes a lever arm 114 which can be moved manually forwardly and backwardly by an operator in order to open and close release valve 108, by the cable 116 which connects the lever 110 to the release valve 108.

While in the preferred embodiment pivotal movement of backrest 18 is effected by a gas spring, other mechanical and electromechanical adjustment mechanisms can also be used, including a hydraulic spring, a coil spring or an electric linear actuator.

One of the significant advantages of having a fixed operating position for the seat cushion 12 in accordance with the preferred embodiment of the invention is that no seat cushion adjustment mechanism, e.g., sliding track or the like, needs to be positioned beneath the seat cushion. By eliminating such an adjustment mechanism, the seat cushion can be designed lower in the vehicle, thereby lowering the center of gravity and providing more room in the driver compartment. Furthermore, the use of a compact seat adjustment mechanism enables the vehicle to be designed with an aerodynamically efficient configuration.

Thus, it can be seen from this foregoing detailed description and attached drawings that the vehicle seat of the present invention is one that provides multiple advantages when used in a compact vehicle, such as an electric car.

Having thus described the invention what is claimed is:

1. A vehicle seat comprising:
   (a) a seat portion having a forward end and a rearward end;
   (b) support means for supporting the seat portion on a base wall in the vehicle;
   (c) a backrest portion having an upper section and a lower section, the lower section being disposed adjacent the rearward end of the seat portion;
   (d) mounting means for adjustably mounting the backrest portion on a generally vertical inner wall of the vehicle, the mounting means permitting movement of the backrest portion between a forward operating position and a rearward operating position relative to the seat portion, both the upper and lower sections of the backrest portion moving upwardly relative to the seat portion when the backrest portion moves from the forward operating position to the rearward operating position; and
   (e) adjustment means for adjusting the backrest portion into a desired position from the forward to the rearward operating position.

2. The vehicle seat in accordance with claim 1 wherein the mounting means comprises first pivot means for pivotably connecting the lower section of the backrest portion to the generally vertical inner wall, and second pivot means for pivotably connecting the upper section of the backrest portion to the vertical inner wall.

3. The vehicle seat in accordance with claim 1 wherein the adjustment means comprises spring means.

4. The vehicle seat in accordance with claim 3 wherein the spring means comprises a gas spring.

5. The vehicle seat in accordance with claim 4 wherein the gas spring is lockable in a multiplicity of adjusted positions.

6. The vehicle seat in accordance with claim 3 wherein the adjustment means includes lever means for adjusting the spring means.

7. The vehicle seat in accordance with claim 1 wherein the support means includes third pivot means for pivoting the seat portion between a seating position and a storage access position.

8. The vehicle seat in accordance with claim 1 wherein a headrest portion is formed on the backrest portion.

9. The vehicle seat in accordance with claim 1 wherein the lower section of the backrest portion includes a lumbar support portion.

10. A vehicle seat comprising:
    (a) a seat portion having a forward end and a rearward end;
    (b) support means for supporting the seat portion on a base wall of a vehicle;
    (c) a backrest portion having an upper section and a lower section, the lower section being disposed adjacent the rearward end of the seat portion;
    (d) mounting means for adjustably mounting the backrest portion on a generally vertical inner wall of the vehicle, the mounting means comprising first pivot means for pivotably connecting the lower section of the backrest portion to the vertical inner wall, and second pivot means for pivotably connecting the upper section of the backrest portion to the vertical inner wall, the first and second pivot means permitting movement of the backrest portion between a forward operating position and a rearward operating position relative to the seat portion, both the upper and lower sections of the backrest portion moving upwardly relative to the seat portion when the backrest portion moves from the forward operating position to the rearward operating position; and
    (e) spring means for adjusting the backrest portion into a suitable position between the forward and rearward operating positions.

11. The vehicle seat in accordance with claim 10 wherein the spring means is lockable.

12. The vehicle seat in accordance with claim 10 wherein said support means includes third pivot means for pivoting the seat portion between a seating position and a storage access position.

13. The vehicle seat in accordance with claim 10 wherein a headrest portion is formed on the backrest portion.

14. In a method of installing an adjustable vehicle seat having a seat portion, and a backrest portion with upper and lower sections, the steps comprising:
    (a) mounting the seat portion in an operating position on a base wall of a vehicle;
    (b) adjustably mounting the backrest portion on a generally vertical inner wall of the vehicle by a first pivot means connecting the upper section of the backrest portion to the vertical inner wall and a second pivot means connecting the lower section of the backrest portion to the vertical inner wall, the first and second pivot means permitting movement of the backrest portion between a forward operating position and a rearward operating position relative to the seating portion; and
    (c) mounting adjustable spring means between the backrest portion and the vertical inner wall of the vehicle for locking the backrest portion in a selected position relative to the seat portion.

15. The method of claim 14 wherein the adjustable spring means comprises a gas spring.

16. The method of claim 14 wherein said adjustable spring means includes lever means for actuating said spring means.

17. The method of claim 14 wherein the step of mounting the seat portion comprises pivotably mounting the seat portion to permit movement between a horizontal seating position and a vertical storage access position.

18. The method of claim 14 further comprising the step of forming a headrest portion on the backrest portion.

* * * * *